Figure 1:
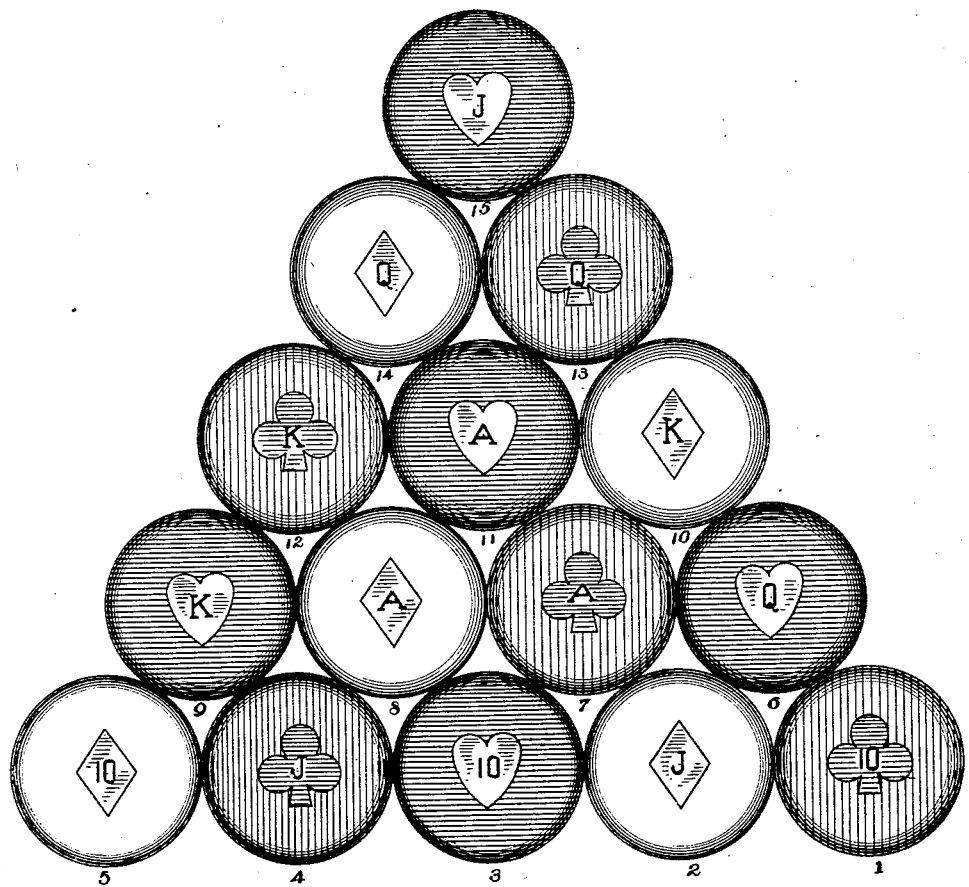

(No Model.)　　　　　　R. G. CLARKE.　　　2 Sheets—Sheet 1.
GAME.

No. 580,253.　　　　　　　　　Patented Apr. 6, 1897.

Witnesses.　　　　　　　　　　　　Inventor.
　　　　　　　　　　　　　　Richard G. Clarke
　　　　　　　　　　　　By Percy B. Hills
　　　　　　　　　　　　　　　　Atty (No Model.)  R. G. CLARKE.  2 Sheets—Sheet 2.
GAME.
No. 580,253.  Patented Apr. 6, 1897.
Fig. 4.
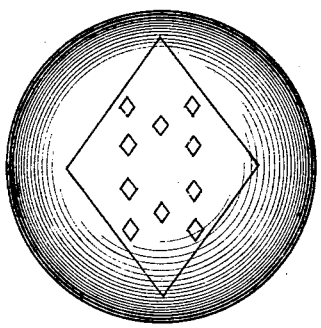
Fig. 2.  Fig. 3.
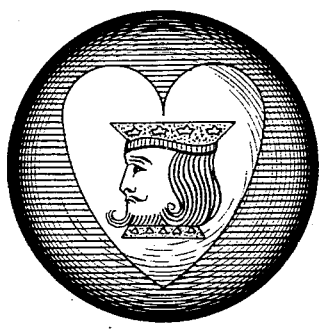 
Witnesses.  Inventor.
Richard G. Clarke
By Percy B. Hills
Atty.

UNITED STATES PATENT OFFICE.

RICHARD G. CLARKE, OF NEW YORK, N. Y., ASSIGNOR OF ONE-FOURTH TO JOEL L. ISAACS, OF SAME PLACE.

GAME.

SPECIFICATION forming part of Letters Patent No. 580,253, dated April 6, 1897.

Application filed January 16, 1897. Serial No. 619,476. (No model.)

*To all whom it may concern:*

Be it known that I, RICHARD G. CLARKE, a citizen of the United States, residing at New York, in the county of New York and State of New York, have invented certain new and useful Improvements in Games, of which the following is a specification.

This invention relates to games, and has for its object to afford amusement and an opportunity to cultivate skill in pocketing balls on a pool-table.

The invention consists of a set of balls marked in a peculiar manner, whereby they are rendered suitable for use in the new games which I have devised. To these new games I have given the generic name "court-pool," and some of the various games comprised under this head I have specifically named "court-pool," "penuchle-pool," "cribbage-pool," "college-pool," "casino-pool," "poker-pool," "jack-pool," "Boston pool," &c. These various games are all played with the same balls on a pool-table and each in accordance with its own particular rules. To play these games, I provide a set of balls, generally fifteen in number, the balls being divided into groups, say three groups of five balls each, and all the balls of a group having a common mark, this common group-mark being different for the various groups. Each of the balls of the various groups has also a value-mark which is different from the value-marks of all the balls of its group, but similar to the value-mark of a ball in each of the other groups. The group-marks which I prefer to employ are the suit-marks of playing-cards, which, when fifteen balls, divided into three groups, are employed, may be heart, diamond, and club. These three would be, as shown in the drawings, a group of five hearts, a group of five diamonds, and a group of five clubs. I prefer also to use different colors as additional group-marks, making, for example, the heart-balls crimson, the diamond-balls orange, and the club-balls blue. It is of course obvious that my purpose of arranging the balls in groups will be accomplished by employing the suit-marks alone or the color-marks alone, or both kinds of marks together. The value-marks for the balls may be of any suitable character, but I prefer to employ the value-marks used in playing-cards, as ace, king, queen, jack, and ten, these marks constituting a predetermined sequence of values. The balls of each group will then have the value-marks ace, king, queen, jack, and ten in addition to the group-marks. If desired, the balls may also be numbered in sequence from "1" to "15," as are the ordinary pool-balls, and will thus be also adapted for use in playing all of the well-known pool-games.

In play the balls are first framed on the table in the usual manner, as shown in the drawings, and the players proceed in turn to pocket the balls, the object of each player being to pocket a number of balls which will yield him the highest possible rack, and to do this he will select as his object-ball one which will so combine with those he has previously pocketed and those he hopes to pocket as to yield him a rack or combination of pocketed balls higher in value than the racks of his opponents when the frame is finished. To do this successfully, a player will take difficult chances in order to secure a high rack and will attempt draw, follow, carom, bank, cushion, and other billiard-shots with the object of gaining an advantageous position for his next shot, at the same time taking note of the racks of his opponents for the purpose of breaking up or checking their play. Thus a player will not adopt the usual plan of pocketing the easiest ball on the table, but will be induced to employ greater skill to make the highest rack, and this will serve to give a player of moderate skill more turns and better chances of winning against an opponent of greater skill, and will also operate to prevent a skilful player from monopolizing the play, as is frequently the case in ordinary pool.

I have formulated a set of general rules to govern the play in various specific games comprised under the general head of "Court-pool." These general rules, which may be supplemented or modified as required by a set of rules provided for each specific game of court-pool, are as follows:

Rule 1. The lead and turns must be drawn for.

Rule 2. The first shot must make at least two object-balls strike a cushion or forfeit the first ball obtained. All balls obtained on first break count, after which players must call ball and pocket.

Rule 3. When a player pockets the cue-ball, he shall forfeit the last ball obtained. Having none, he shall forfeit the first ball thereafter obtained.

Rule 4. When three or more players are in the game, each player's chances are ended when he has obtained five balls, they constituting his record for that frame. When a player has pocketed his five balls, he must play for safety, in which play the cue-ball must hit an object-ball or forfeit the last ball pocketed.

Rule 5. If a player in completing five balls pockets more than he needs to make five, he shall count only the balls called and spot the others.

Rule 6. If there are only two players, they may continue to play till all the balls are pocketed, and any five balls pocketed by a player in succession may be taken to determine the value of his rack.

In the specific game of court-pool proper the rules are as follows:

Rule 1. The general rules of court-pool govern the play.

Rule 2. The crimson flush is the highest rack, the orange flush the next, and the blue flush the next, the racks then following in value as do the hands in the game of poker.

The rules of penuchle-pool are as follows:

Rule 1. The general rules of court-pool govern the play.

Rule 2. Game is five hundred or more points, hearts are trumps, and count is made according to the penuchle-table, a player counting any five balls pocketed in succession by him, each player being limited to five balls except where there are only two players.

Rule 3. King and queen of common suit count thirty, king and queen of trumps count forty, jack of diamonds and queen of clubs (penuchle) count fifty, three tens count sixty, three jacks count seventy, three queens count eighty, three kings count ninety, three aces count one hundred, three jacks and queen of clubs (double penuchle) count one hundred and twenty-five, sequence of common suit count one hundred and forty, and sequence of trumps count one hundred and fifty. Game is counted at the end of a frame by adding the numbers on the balls pocketed, the total of which is one hundred and twenty.

Rule 4. When a player lacks a few points of being out, he may declare game and count the game on his balls, but if he fails to count enough he loses by so declaring.

From the above description and rules the manner of playing court-pool will be obvious.

It is of course to be understood that the general and specific rules herein given may be variously modified, those stated being merely set forth for the purpose of explaining the utility of the balls which are the subject of my invention. Moreover, many other interesting games than those specified may be devised to be played with the balls herein described.

In the drawings forming part of this specification, Figure 1 shows a set of fifteen balls embodying my invention, the value-marks thereon being the letters "A," "K," "Q," and "J," and the number "10," said letters standing, respectively, for ace, king, queen, and jack. Figs. 2, 3, and 4 each show one of a set of balls embodying a slight modification of the manner of indicating the value-marks, the ace, king, queen, and jack characters, and the ten dots employed in playing-cards being used as value-marks in such set.

The horizontal shade-marks and the vertical shade-marks on the balls in Figs. 1, 3, and 4 are intended to indicate, respectively, crimson and blue colors, and the absence of such shade-marks on the balls in Figs. 1 and 2 is intended to represent orange color, these colors covering the balls except where the group-marks and the small circles left for the numbering of the balls in sequence are located. The heart-balls will therefore be crimson, the diamond-balls orange, and the club-balls blue.

The numbers "1" to "15," inclusive, (shown just below the balls in Fig. 1,) are marked each on the ball just above it. These numbers are of course actually placed on the balls, but would be invisible in the views of the balls shown in the drawings, and for this reason they are placed in Fig. 1 just below the same. While I generally prefer to employ fifteen balls in playing my new games, it will of course be understood that a greater or less number may be used without departing from my invention.

When the suit-marks of playing-cards are employed in addition to the colors as group-marks for the balls, the value-marks are generally superposed on said suit-marks and may be in the shape of the letters "A," "K," "Q," and "J" and the number "10," as shown in Fig. 1, or in the shape of the symbolic heads to denote the kings, queens, and jacks, as shown in Figs. 2 and 3, and the ten dots used in cards to denote the ten-spots, as shown in Fig. 4, one ball in each group having its suit-mark left blank to denote the ace of that suit. For convenience in identifying the balls these group and value marks are generally placed on two opposite sides of the balls, or they may be on four sides thereof.

Having thus described my invention, what I claim as new, and desire to secure by Letters Patent, is—

1. A series of balls adapted for play on a pool-table, said balls being so marked as to be divided thereby into groups, each group comprising a plurality of balls, all of the balls of a group bearing a common or group mark that is different from the common or group marks of the other groups, and each of the balls of a group bearing a value-mark that is different from the value-marks of all the other balls of its group, substantially as set forth.

2. A series of balls adapted for play on a pool-table, said balls being so marked as to be divided thereby into groups, each group comprising a plurality of balls, all the balls of a group bearing a common or group mark that is different from the common or group marks of the other groups, and each of the balls of a group bearing a value-mark that is different from the value-marks of all the other balls in its group but similar to the value-mark of a ball in each of the other groups, substantially as set forth.

3. A series of balls adapted for play on a pool-table, said balls being so marked as to be divided thereby into groups, each group comprising a plurality of balls, all the balls of a group bearing a common or group mark that is different from the common or group marks of the other groups, and each of the balls of a group bearing a value-mark that is different from the value-marks of all the other balls of its group but similar to the value-mark of a ball in each of the other groups, the value-marks for the balls being the value-marks such as are used in playing-cards, substantially as set forth.

4. A series of balls adapted for play on a pool-table, said balls being so marked as to be divided thereby into groups, each group comprising a plurality of balls, all the balls of a group bearing a common or group mark that is different from the common or group marks of the other groups, and each of the balls of a group bearing a value-mark that is different from the value-marks of all the other balls of its group but similar to the value-mark of a ball in each of the other groups, the value-marks for the balls being a sequence of the value-marks such as are used in playing-cards, substantially as set forth.

5. A series of balls adapted for play on a pool-table, said balls being so marked as to be divided thereby into groups, each group comprising a plurality of balls, all the balls of a group bearing a common or group mark that is different from the common or group marks of the other groups, and each of the balls of a group bearing a value-mark that is different from the value-marks of all the other balls of its group but similar to the value-mark of a ball in each of the other groups, the group-marks and value-marks for the balls being the suit-marks and value-marks used in playing-cards, substantially as set forth.

6. A series of balls adapted to play on a pool-table, said balls being so marked as to be divided thereby into groups, each group comprising a plurality of balls, all the balls of a group bearing a common or group mark that is different from the common or group marks of the other groups, and each of the balls of a group bearing a value-mark that is different from the value-marks of all the other balls of its group but similar to the value-mark of a ball in each of the other groups, the group-marks and value-marks for the balls being the suit-marks and a sequence of the value-marks used in playing-cards, substantially as set forth.

7. A series of balls adapted for play on a pool-table, said balls being so marked as to be divided thereby into groups, each group comprising a plurality of balls, all the balls of a group bearing a common or group mark that is different from the common or group marks of the other groups, each of the balls of a group bearing a value-mark that is different from the value-marks of all the other balls of its group, and each of the balls of the series bearing a value-mark that is different from the value-marks of all the other balls, substantially as set forth.

In testimony whereof I have hereunto set my hand in the presence of two witnesses.

RICHARD G. CLARKE.

Witnesses:
   JOS. W. TANTUM,
   WM. H. FABER.